United States Patent
Sharifi et al.

(10) Patent No.: US 11,814,062 B2
(45) Date of Patent: Nov. 14, 2023

(54) DETECTING AND HANDLING DRIVING EVENT SOUNDS DURING A NAVIGATION SESSION

(71) Applicant: GOOGLE LLC, Mountain View, CA (US)

(72) Inventors: Matthew Sharifi, Mountain View, CA (US); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 496 days.

(21) Appl. No.: 17/273,673

(22) PCT Filed: Nov. 18, 2020

(86) PCT No.: PCT/US2020/060984
§ 371 (c)(1),
(2) Date: Mar. 4, 2021

(87) PCT Pub. No.: WO2022/108580
PCT Pub. Date: May 27, 2022

(65) Prior Publication Data
US 2022/0355814 A1    Nov. 10, 2022

(51) Int. Cl.
*B60W 50/14* (2020.01)
*G06N 20/00* (2019.01)
*G01C 21/36* (2006.01)

(52) U.S. Cl.
CPC ......... *B60W 50/14* (2013.01); *G01C 21/3697* (2013.01); *G06N 20/00* (2019.01); *B60W 2050/143* (2013.01); *B60W 2050/146* (2013.01)

(58) Field of Classification Search
CPC ........... B60W 50/14; B60W 2050/143; B60W 2050/146; G01C 21/3697; G06N 20/00;
(Continued)

(56) References Cited

U.S. PATENT DOCUMENTS 6,778,073 B2   8/2004  Lutter et al.
7,437,290 B2   10/2008 Danieli
(Continued)

FOREIGN PATENT DOCUMENTS

DE   10 2015 106400 A1   10/2016
WO   WO-2012/143578 A1   10/2012

OTHER PUBLICATIONS

International Search Report and Written Opinion for Application No. PCT/US2020/060984, dated Jul. 30, 2021.
(Continued)

*Primary Examiner* — Hirdepal Singh
(74) *Attorney, Agent, or Firm* — MARSHALL, GERSTEIN & BORUN LLP

(57) ABSTRACT

To identify driving event sounds during navigation, a client device in a vehicle provides a set of navigation directions for traversing from a starting location to a destination location along a route. During navigation to the destination location, the client device identifies audio that includes a driving event sound from within the vehicle or an area surrounding the vehicle. In response to determining that the audio includes the driving event sound, the client device determines whether the driving event sound is artificial. In response to determining that the driving event sound is artificial, the client device presents a notification to the driver indicating that the driving event sound is artificial or masks the driving event sound to prevent the driver from hearing the driving event sound.

20 Claims, 8 Drawing Sheets

(58) Field of Classification Search
CPC ........... G06N 3/045; G06N 5/01; G06N 7/01; G06N 20/10; G06N 20/20; H04R 2499/13; G08G 1/0962; G08G 1/0965; G08G 1/166
USPC ...................................................... 340/425.5
See application file for complete search history.

(56) References Cited

U.S. PATENT DOCUMENTS

| | | | |
|---|---|---|---|
| 7,937,118 B2 | 5/2011 | Coutinho et al. | |
| 8,893,169 B2 | 11/2014 | Klappert et al. | |
| 9,413,322 B2 | 8/2016 | Soulodre | |
| 10,026,410 B2 | 7/2018 | Gurijala et al. | |
| 10,279,739 B2* | 5/2019 | Di Censo | G08G 1/005 |
| 10,343,604 B2 | 7/2019 | Haupts et al. | |
| 10,546,590 B2 | 1/2020 | Sharma et al. | |
| 10,755,691 B1* | 8/2020 | Herman | G10K 11/17853 |
| 11,244,564 B2* | 2/2022 | Seifert | B60W 60/0015 |
| 11,453,334 B2* | 9/2022 | Igarashi | H04R 1/025 |
| 2010/0280749 A1 | 11/2010 | Furumoto et al. | |
| 2015/0002287 A1* | 1/2015 | Valeri | B60Q 5/005 340/441 |
| 2015/0070516 A1 | 3/2015 | Shoemake et al. | |
| 2015/0137998 A1* | 5/2015 | Marti | G10K 15/02 340/901 |
| 2020/0228876 A1 | 7/2020 | Gordon | |
| 2022/0157165 A1* | 5/2022 | Dantrey | G06N 3/047 |
| 2022/0223060 A1* | 7/2022 | Hayward | G05D 1/0214 |

OTHER PUBLICATIONS

Fernandez et al., "Driver Distraction Using Visual-Based Sensors and Algorithms," Sensors, 16(11):1805 (2016).

Jiang et al., "SafeDrive: Detecting Distracted Driving Behaviors Using Wrist-Worn Devices," Proceedings of the ACM on Interactive, Mobile, Wearable and Ubiquitous Technologies, 1(4)1-22 (2017).

* cited by examiner

DETECTING AND HANDLING DRIVING EVENT SOUNDS DURING A NAVIGATION SESSION

FIELD OF THE DISCLOSURE

The present disclosure relates to detecting driving event sounds and, more particularly, to preventing driver distraction by masking the effects of artificial driving event sounds generated by electronic devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, etc. or embedded devices generate step-by-step navigation directions. Typically, a user specifies the starting point and the destination, and a software application displays and/or presents the directions in an audio format immediately and/or as the user travels from the starting point to the destination.

During navigation there may be many distractions to the driver. One type of distraction may be when driving-related noises (e.g., emergency vehicle sirens, car horns, vehicle collisions, etc.) are played within the vehicle. These driving-related noises may deceive the driver into thinking the noises are real noises coming from external sources rather than artificial sounds generated by devices within the vehicle. As a result, the driver may react to the driving-related noises, for example by slowing down or pulling over unnecessarily.

SUMMARY

In some implementations, a mapping application operating within a vehicle may identify driving event sounds from within the vehicle or from the area surrounding the vehicle. For example, the mapping application may identify the driving event sounds while presenting navigation directions for assisting a driver in traversing from a starting location to a destination location. The driving event sounds may be emergency vehicle sirens, car horns, the sounds of vehicle collisions, etc.

The mapping application may identify the driving event sounds by communicating with other applications executing on a client device, for example, via an application programming interface (API). The other applications executing on the client device may provide characteristics of audio content being played by the other applications, such as an audio stream for current or upcoming audio content or metadata describing the audio content (e.g., a title of the audio content, a description of the audio content, terms, phrases, or sounds included in the audio content, the length of the audio content, the language of the audio content, etc.). Additionally, the mapping application may communicate with other devices within the vehicle (e.g., a vehicle head unit), such as via a short-range communication link. The other devices may also provide characteristics of audio content to the mapping application. Still further, the mapping application may identify the driving event sounds by comparing audio fingerprints of predetermined driving event sounds to ambient audio in the surrounding area.

In any event, when a driving event sound is identified, the mapping application may determine whether the driving event sound is real (i.e., the driving event sound is provided from the vehicle or from an external source outside of the vehicle, such as another vehicle or an emergency vehicle and requires the driver's attention) or artificial (i.e., the driving event sound comes from an electronic device within the vehicle and does not require the driver's attention). The mapping application may determine that the driving event sound is artificial if the driving event sound is identified from an electronic source within the vehicle, such as another application executing on the client device or another device. In other implementations, the mapping application may determine whether the driving event sound is real or artificial by applying characteristics of the driving event sound to a machine learning model trained to distinguish between real and artificial driving event sounds. The characteristics of the driving event sound may include audio characteristics of the driving event sound as well as environmental characteristics at the vehicle at the time of the driving event sound, such as whether a vehicle door is open which may result in a vehicle door alarm.

When the mapping application identifies an artificial driving event sound, the mapping application attempts to mask the effect of the driving event sound on the driver to substantially prevent the driver from being distracted by the driving event sound. For example, the mapping application may display a notification on the client device indicating that the driving event sound is artificial and instructing the driver to ignore it. The mapping application may also play an audio notification with similar instructions. Additionally or alternatively, the mapping application may prevent at least a portion of the driving event sound from being played. For example, the mapping application may mute the audio or decrease the volume on the audio during the driving event sound. In other implementations, the mapping application may filter out the audio during the driving event sound via a bandpass filter, for example.

When the mapping application identifies a real driving event sound, the mapping application may alert the driver that the sound is real so that the driver does not ignore the driving event sound. For example, the mapping application may display a notification on the client device indicating that the driving event sound is real and instructing the driver to respond appropriately. The mapping application may also play an audio notification with similar instructions.

In this manner, the mapping application may reduce the amount of distraction to the driver, thereby improving driver safety. Such a reduction in the amount of distraction is achieved by filtering or masking the artificial sounds that relate to driving events. As disclosed herein, this filtering may reduce the volume of such artificial sounds, remove portions or all of such artificial sounds, or provide one or more notifications to inform the driver that the artificial sound is not real. In this manner, the driver does not react and alter their control of a vehicle (i.e. react to the sound) either by not hearing the artificial sound or by being informed that the artificial sound is not real. As such, the mapping application disclosed herein has greatly improved safety as the influence of artificial driving sounds on the navigation instructions is actively reduced. The mapping application may also assist the driver in identifying emergency vehicles, vehicle collisions, or vehicle malfunctions and help the driver respond appropriately.

One example embodiment of the techniques of this disclosure is a method for identifying driving event sounds during a navigation session. The method includes providing a set of navigation directions for traversing from a starting location to a destination location along a route. During navigation to the destination location, the method includes identifying audio that includes a driving event sound from within the vehicle or an area surrounding the vehicle. In response to determining that the audio includes the driving event sound, the method includes determining whether the driving event sound is artificial. In response to determining that the driving event sound is artificial, the method includes presenting a notification to the driver indicating that the driving event sound is artificial, or masking the driving event sound to prevent the driver from hearing the driving event sound.

Another example embodiment of the techniques of this disclosure is a client device for identifying driving event sounds. The client device includes one or more processors, and a non-transitory computer-readable memory coupled to the one or more processors and storing instructions thereon. The instructions, when executed by the one or more processors, cause the client device to identify audio that includes a driving event sound from within the vehicle or an area surrounding the vehicle. In response to determining that the audio includes the driving event sound, the instructions cause the client device to determine whether the driving event sound is artificial. In response to determining that the driving event sound is artificial, the instructions cause the client device to present a notification to the driver indicating that the driving event sound is artificial, or mask the driving event sound to prevent the driver from hearing the driving event sound.

Yet another example embodiment of the techniques of this disclosure is non-transitory computer-readable memory storing instructions thereon. The instructions, when executed by one or more processors, cause the one or more processors to identify audio that includes a driving event sound from within the vehicle or an area surrounding the vehicle. In response to determining that the audio includes the driving event sound, the instructions cause the one or more processors to determine whether the driving event sound is artificial. In response to determining that the driving event sound is artificial, the instructions cause the one or more processors to present a notification to the driver indicating that the driving event sound is artificial, or mask the driving event sound to prevent the driver from hearing the driving event sound.

DETAILED DESCRIPTION

Overview

Figure 1:
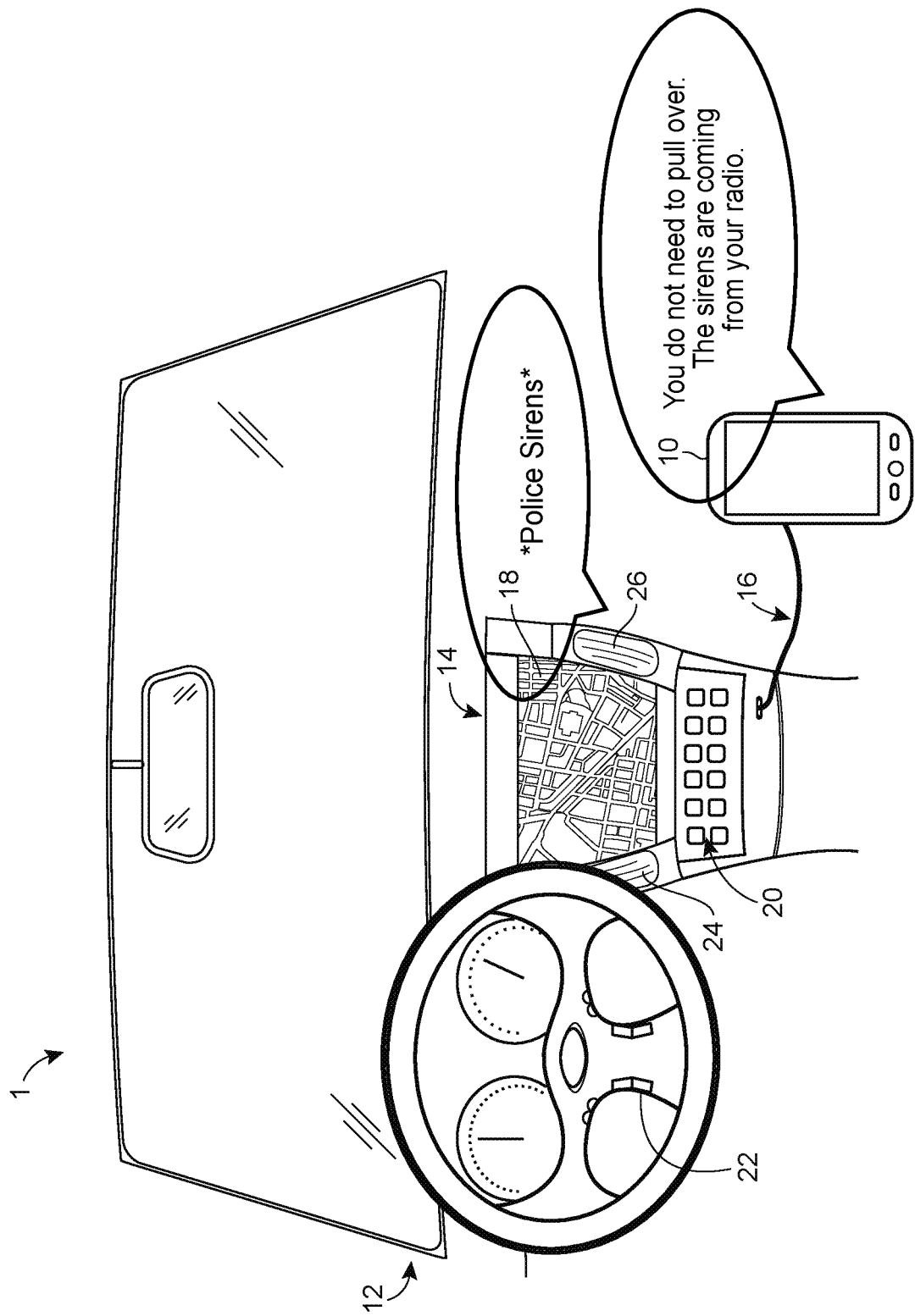
FIG. 1 illustrates an example vehicle in which the techniques of the present disclosure can be used to detect driving event sounds.

Generally speaking, the techniques for identifying driving event sounds can be implemented in one or several client devices, a vehicle head unit, one or several network servers, or a system that includes a combination of these devices. However, for clarity, the examples below focus primarily on an embodiment in which a client device executing a mapping application obtains audio playback data from another application executing on the client device or from a device communicatively connected to the client device. The client device may communicate with other applications executing on the client device (e.g., via an API), or other devices within the vicinity of the client device (e.g., a short-range communication link), such as the vehicle head unit or other client devices. The client device may also obtain or compute an ambient audio fingerprint of the audio within the area. In any event, the client device determines whether the audio from audio playback data or the ambient audio fingerprint includes a driving event sound. More specifically, the client device may compare the ambient audio fingerprint or an audio fingerprint from the audio stream included in the audio playback data to audio fingerprints of predetermined driving event sounds. When there is a match, the client device may determine that the audio includes a driving event sound.

In other implementations, the client device may apply the ambient audio or the audio stream from the audio playback data, including any derived features from the ambient audio or other audio stream such as an audio fingerprint, as an input to a trained machine learning model for identifying driving event sounds. More specifically, a server device may have generated the trained machine learning model by training a machine learning model using audio features for a set of audio streams, and indications of whether or not a driving event sound corresponds to each audio stream. The audio streams may be classified as including a driving event sound or not including a driving event sound. In some implementations, the audio streams may be classified according to particular types of driving event sounds, such as an emergency vehicle siren, a sound of a vehicle collision, a vehicle malfunction alarm, or a vehicle horn honking. In any event, the server device may provide the trained machine learning model to the client device. The client device may then continuously or periodically apply ambient audio features or audio features from audio streams included in the audio playback data to the trained machine learning model to identify driving event sounds.

When a driving event sound is identified, the client device may determine whether the driving event sound is real or artificial. The client device may determine that the driving event sound is artificial if the driving event sound is identified from a source within the vehicle, such as another application executing on the client device or another device. In other implementations, the client device may determine that the driving event sound is artificial by comparing the ambient audio fingerprint or an audio fingerprint from the audio stream included in the audio playback data to audio fingerprints of predetermined artificial driving event sounds. When there is a match, the client device may determine that the audio includes an artificial driving event sound. The client device may also compare the ambient audio fingerprint or an audio fingerprint from the audio stream included in the audio playback data to audio fingerprints of predetermined real driving event sounds. When there is a match, the client device may determine that the audio includes a real driving event sound. In yet other implementations, the client device may determine whether the driving event sound is real or artificial by applying characteristics of the driving event sound to a machine learning model trained to distinguish between real and artificial driving event sounds. The server device may have generated the trained machine learning model for classifying driving event sounds as real or artificial by training a machine learning model using characteristics of driving event sounds and indications of whether each driving event sound is real or artificial. The characteristics of each driving event sound may include audio characteristics of the driving event sound as well as environmental characteristics at the vehicle at the time of the driving event sound. In any event, the server device may provide the trained machine learning model to the client device. The client device may then apply characteristics of a detected driving event sound as an input to the trained machine learning model to determine whether the driving event sound is real or artificial.

When the client device identifies an artificial driving event sound, the client device may notify the driver that the driving event sound is artificial and may instruct the driver to ignore it. The client device may also mute the audio, decrease the volume of the audio, or filter the driving event sound from the audio. When the client device identifies a real driving event sound, the client device may alert the driver that the sound is real so that the driver can respond appropriately.

In some implementations, the client device identifies driving event sounds during a navigation session provided by the mapping application. For example, when a user such as the driver requests navigation directions from a starting location to a destination location, the mapping application may provide the request to a navigation data server. The navigation data server may then provide a set of navigation directions to the client device which may be presented by the mapping application. While the mapping application presents the set of navigation directions to the user, the client device may identify driving event sounds and mask the effects of artificial driving event sounds on the driver. In other implementations, the client device identifies driving event sounds any time the client device is within a vehicle, regardless of whether there is an active navigation session. The user of the client device may request that the mapping application identify driving event sounds during navigation sessions or any time when the user is within a vehicle. Beneficially therefore, the mapping application disclosed herein can improve driving safety regardless of whether navigation is being used or not.

Example Hardware and Software Components

Referring to FIG. 1, an example environment 1 in which the techniques outlined above can be implemented includes a portable device 10 and a vehicle 12 with a head unit 14. The portable device 10 may be a smart phone, a tablet computer, or an in-vehicle navigation system, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play audio instructions or audio notifications sent from the portable device 10.

Figure 2:
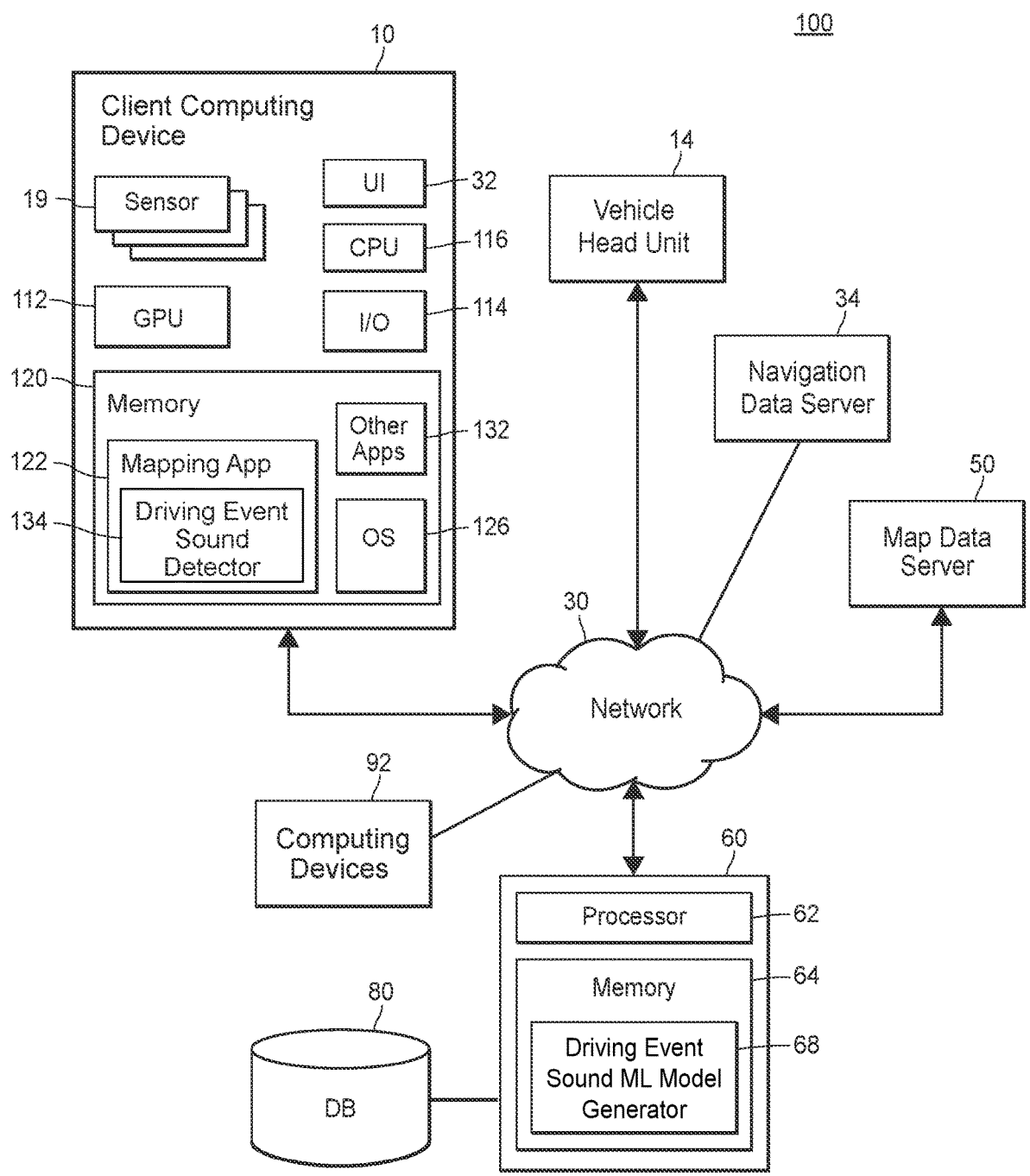
FIG. 2 is a block diagram of an example system in which techniques for detecting driving event sounds can be implemented.

An example communication system 100 in which a driving event sound detection system can be implemented is illustrated in FIG. 2. The communication system 100 includes a client device 10 configured to execute a geographic application 122, which also can be referred to as "mapping application 122." Depending on the implementation, the application 122 can display an interactive digital map, request and receive routing data to provide driving, walking, or other navigation directions including audio navigation directions, provide various geolocated content, etc. The client device 10 may be operated by a user (also referred to herein as a "driver") displaying a digital map while navigating to various locations. The communication system 100 also includes a vehicle head unit 14 which may communicate with the client device 10, via a short-range communication link such as Bluetooth, Wi-Fi Direct, etc. Furthermore, the communication system 100 may include other computing devices 92 within the vicinity of the client device 10. For example, when the client device 10 is a driver's smart phone, the other computing devices 92 may include smart phones of passengers within the vehicle 12, or a tablet or wearable device of the driver.

In addition to the client device 10, the communication system 100 includes a server device 60 configured to provide trained machine learning models to the client device 10. The server device 60 can be communicatively coupled to a database 80 that stores, in an example implementation, a first machine learning model for identifying driving event sounds. The training data used as a training input for the first machine learning model may include audio features for a set of audio streams (i.e., characteristics of each audio stream such as frequencies, pitches, tones, amplitudes, etc.), and indications of whether or not a driving event sound is included in each audio stream. The audio streams may be classified as including a driving event sound or not including a driving event sound. In some implementations, the audio streams may be classified according to particular types of driving event sounds, such as an emergency vehicle siren, a sound of a vehicle collision, a vehicle malfunction alarm, or a vehicle horn honking. The training data is described in further detail below with reference to FIG. 3. Additionally, the database 80 may store a second machine learning model for determining whether a driving event sound is real or artificial. The training data used as a training input for the second machine learning model may include characteristics of driving event sounds and indications of whether each driving event sound is real or artificial. The training data is described in further detail below with reference to FIG. 4.

More generally, the server device 60 can communicate with one or several databases that store any type of suitable geospatial information or information that can be linked to a geographic context. The communication system 100 also can include a navigation data server 34 that provides navigation directions such as driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client device 10 may be a smartphone or a tablet computer. The client device 10 may include a memory 120, one or more processors (CPUs) 116, a graphics processing unit (GPU) 112, an I/O module 14 including a microphone and speakers, a user interface (UI) 32, and one or several sensors 19 including a Global Positioning Service (GPS) module. The memory 120 can be a non-transitory memory and can include one or several suitable memory modules, such as random access memory (RAM), read-only memory (ROM), flash memory, other types of persistent memory, etc. The I/O module 114 may be a touch screen, for example. In various implementations, the client device 10 can include fewer components than illustrated in FIG. 2 or conversely, additional components. In other embodiments, the client device 10 may be any suitable portable or non-portable computing device. For example, the client device 10 may be a laptop computer, a desktop computer, a wearable device such as a smart watch or smart glasses, etc.

The memory 120 stores an operating system (OS) 126, which can be any type of suitable mobile or general-purpose operating system. The OS 126 can include application programming interface (API) functions that allow applications to retrieve sensor readings. For example, a software application configured to execute on the computing device 10 can include instructions that invoke an OS 126 API for retrieving a current location of the client device 10 at that instant. The API can also return a quantitative indication of how certain the API is of the estimate (e.g., as a percentage).

The memory 120 also stores a mapping application 122, which is configured to generate interactive digital maps and/or perform other geographic functions, as indicated above. The mapping application 122 can receive navigation instructions including audio navigation instructions and present the navigation instructions. The mapping application 122 also can display driving, walking, or transit directions, and in general provide functions related to geography, geolocation, navigation, etc. Additionally, the mapping application 122 can detect driving event sounds via the driving event sound detector 134. The driving event sound detector 134 may also determine whether a detected driving event sound is real or artificial. If the detected driving event sound is artificial, the driving event sound detector 134 may present a notification to the driver indicating that the sound is artificial and/or instructing the driver to ignore it. The driving event sound detector 134 may also or instead mute or lower the volume of the client device or the other device playing the driving event sound as the driving event sound is being played. Still further, the driving event sound detector 134 may filter an audio stream to prevent the audio stream from playing the driving event sound. If the detected driving event sound is real, the driving event sound detector 134 may present a notification to the driver indicating that the sound is real and/or instructing the driver to respond appropriately (e.g., to pull over, call for help, take the vehicle in for service, etc.).

It is noted that although FIG. 2 illustrates the mapping application 122 as a standalone application, the functionality of the mapping application 122 also can be provided in the form of an online service accessible via a web browser executing on the client device 10, as a plug-in or extension for another software application executing on the client device 10, etc. The mapping application 122 generally can be provided in different versions for different respective operating systems. For example, the maker of the client device 10 can provide a Software Development Kit (SDK) including the mapping application 122 for the Android™ platform, another SDK for the iOS™ platform, etc.

In addition to the mapping application 122, the memory 120 stores other client applications 132, such as music applications, video applications, gaming applications, streaming applications, radio applications, social media applications, etc. which play audio content. These applications 132 may expose APIs for communicating with the mapping application 122.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a driving event sound machine learning (ML) model generator 68, which can generate a first machine learning model for identifying driving event sounds and a second machine learning model for determining whether an identified driving event sound is real or artificial.

The driving event sound ML model generator 68 and the driving event sound detector 134 can operate as components of a driving event sound detection system. Alternatively, the driving event sound detection system can include only server-side components and simply provide the driving event sound detector 134 with instructions to present notifications or adjust the audio. In other words, driving event sound detection techniques in these embodiments can be implemented transparently to the driving event sound detector 134. As another alternative, the entire functionality of the driving event sound ML model generator 68 can be implemented in the driving event sound detector 134.

For simplicity, FIG. 2 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the driving event sound detector 134 operating in the client device 10 receives and transmits data to the server device 60 and/or the navigation data server 34. Thus, in one example, the client device 10 may transmit a communication to the navigation data server 34 requesting navigation directions from a starting location to a destination. Accordingly, the navigation data server 34 may generate a set of navigation instructions and provide the set of navigation instructions to the client device 10. The client device 10 may also transmit a communication to the driving event sound ML model generator 68 (implemented in the server device 60) for the first machine learning model for identifying driving event sounds and the second machine learning model for determining whether an identified driving event sound is real or artificial.

The client device 10 may then apply audio features to the first machine learning model to detect driving event sounds, and may apply characteristics of detected driving event sounds to the second machine learning model to determine whether the driving event sounds are real or artificial.

In some embodiments, the driving event sound ML model generator 68 may generate a separate machine learning model for each type of driving event sound. For example, the driving event sound ML model generator 68 may generate one machine learning model for identifying police sirens, another machine learning model for identifying fire truck sirens, yet another machine learning model for identifying ambulance sirens, another machine learning model for identifying a vehicle honking, another machine learning model for identifying the sound of a vehicle collision, yet another machine learning model for identifying a vehicle malfunction alarm, etc. In other implementations, the driving event sound ML model generator 68 may generate a single machine learning model with a different output class for each type of driving event sound.

Figure 3:
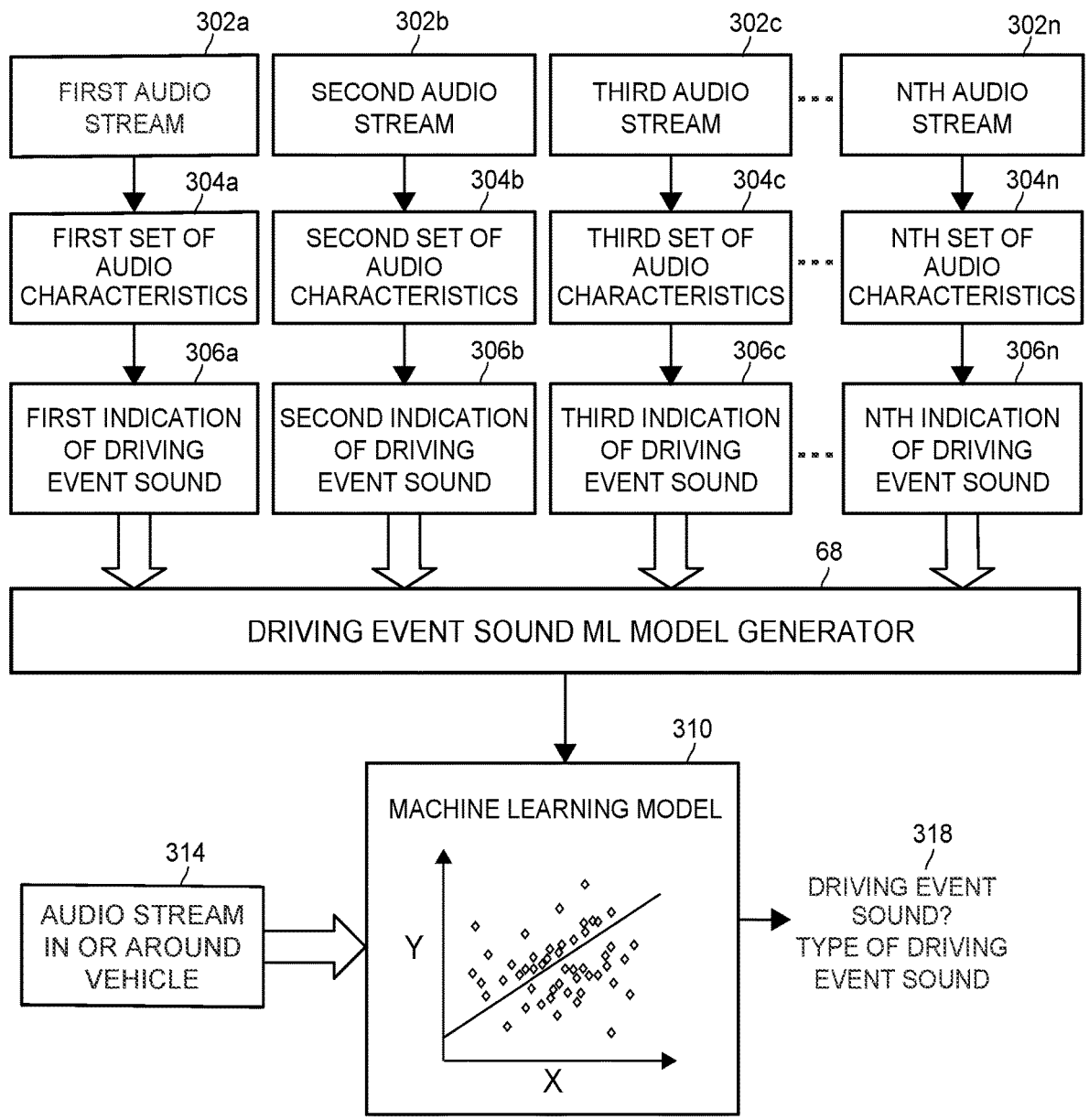
FIG. 3 is a combined block and logic diagram that illustrates the process for identifying a driving event sound based on characteristics of an audio stream using a first machine learning model.

FIG. 3 schematically illustrates an example process for training a first machine learning model 310 for detecting driving event sounds and applying the audio features of an audio stream to the first machine learning model 310 to detect a driving event sound in the audio stream. As described above, the driving event sound ML model generator 68 in the server device 60 may generate the first machine learning model 310. The first machine learning model 310 may be generated using various machine learning techniques such as a regression analysis (e.g., a logistic regression, linear regression, or polynomial regression), k-nearest neighbors, decisions trees, random forests, boosting (e.g., extreme gradient boosting), neural networks (e.g., a convolutional neural network), support vector machines, deep learning, reinforcement learning, Bayesian networks, etc. To generate the first machine learning model 310, the driving event sound ML model generator 68 receives training data including a first audio stream 302a having a first set of audio characteristics 304a (e.g., audio features), and a first indication of whether the first audio stream 302a includes a driving event sound 306a. The first indication 306a may also include the type of driving event sound (e.g., an emergency vehicle siren, a sound of a vehicle collision, a vehicle malfunction alarm, or a vehicle horn honking). The training data also includes a second audio stream 302b having a second set of audio characteristics 304b, and a second indication of whether the second audio stream 302b includes a driving event sound 306b. Furthermore, the training data includes a third audio stream 302c having a third set of audio characteristics 304c, and a third indication of whether the third audio stream 302c includes a driving event sound 306c. Still further, the training data includes an nth audio stream 302n having an nth set of audio characteristics 304n, and an nth indication of whether the nth audio stream 302n includes a driving event sound 306n.

While the example training data includes four audio streams 302a-302n, this is merely an example for ease of illustration only. The training data may include any number of audio streams and corresponding audio characteristics and indications of whether the audio streams include a driving event sound.

The driving event sound ML model generator 68 then analyzes the training data to generate a first machine learning model 310 for detecting driving event sounds. In some implementations, the driving event sound ML model generator 68 generates a separate machine learning model for each type of driving event sound. While the first machine learning model 310 is illustrated as a linear regression model, the first machine learning model 310 may be another type of regression model such as a logistic regression model, a decision tree, a neural network, a hyperplane, or any other suitable machine learning model.

For example, when the machine learning technique is a neural network, the driving event sound ML model generator 68 may generate a graph having input nodes, intermediate or "hidden" nodes, edges, and output nodes. The nodes may represent a test or function performed on audio characteristics and the edges may represent connections between nodes. In some embodiments, the output nodes may include indications of whether the audio stream includes a driving event sound and/or the type of driving event sound. The indications may be likelihoods that the audio stream includes a driving event sound and/or likelihood that the audio stream includes a particular type of driving event sound.

For example, a neural network may include four inputs nodes representing audio characteristics that are each connected to several hidden nodes. The hidden nodes are then connected to an output node that indicates whether the audio stream includes a driving event sound. The connections may have assigned weights and the hidden nodes may include tests or functions performed on the audio characteristics.

In some embodiments, the hidden nodes may be connected to several output nodes each indicating a type of driving event sound. In this example, the four input nodes may include the frequency, amplitude, pitch, and tone of an audio stream. Tests or functions may be applied to the input values at the hidden nodes. Then the results of the tests or functions may be weighted and/or aggregated to determine a likelihood that the audio stream includes a driving event sound. When the likelihood is above a threshold likelihood, the neural network may determine that the audio stream includes a driving event sound.

However, this is merely one example of the inputs and resulting output of the neural network for detecting driving event sounds. In other examples, any number of input nodes may include any suitable audio characteristics for an audio stream. Additionally, any number of output nodes may determine likelihoods of an audio stream including a driving event sound or likelihoods of the audio stream including particular types of driving event sounds.

As additional training data is collected, the weights, nodes, and/or connections may be adjusted. In this manner, the machine learning model is constantly or periodically updated.

In any event, the driving event sound ML model generator 68 may provide the first machine learning model 310 to the client device 10. Then when the driving event sound detector 134 obtains an audio stream 314, such as during a navigation session, the driving event sound detector 134 may apply characteristics of the audio stream 314 as in input to the first machine learning model 310 to determine whether the audio stream 314 includes a driving event sound 318. Such a determination can be provided as an output of the first machine learning model 310. The driving event sound detector 134 may also determine the type of driving event sound 318 using the first machine learning model 310, which may provide such a determination as an output. For example, for a first audio stream obtained from audio playback data at another application executing on the client device 10, the first machine learning model 310 determines that the first audio stream includes a driving event sound.

For a second audio stream obtained from audio playback data at a device 14, 92 communicatively connected to the client device 10, the first machine learning model 310 determines that the second audio stream includes a police siren. For a third audio stream obtained from ambient audio within the area of the vehicle 12, the machine learning model 310 determines that the third audio stream does not include a driving event sound.

As described above, machine learning is merely one example technique for detecting a driving event sound. In other implementations, the driving event sound detector 134 may detect a driving event sound by comparing audio fingerprints of predetermined driving event sounds to ambient audio within the area of the vehicle 12 or audio streams from audio playback data from another application executing on the client device 10 or from a device 14, 92 communicatively connected to the client device 10. When there is a match, the driving event sound detector 134 may determine that the audio includes a driving event sound. More specifically, the driving event sound detector 134 may extract fingerprints from the ambient audio or audio streams, identify features of the ambient audio or audio stream fingerprints, and may compare features of the ambient audio or audio stream fingerprints to features of audio fingerprints from predetermined driving event sounds. For example, frequencies, pitches, tones, amplitudes, etc., may be stored as audio fingerprint features. Then each of these audio fingerprint features for the predetermined driving event sounds may be compared to the features of the ambient audio or audio stream fingerprints.

In some embodiments, the audio fingerprint features for the predetermined driving event sounds may be compared to the features for the ambient audio or audio stream fingerprints using a nearest neighbors algorithm. The nearest neighbors algorithm may identify audio fingerprint features for predetermined driving event sounds which are the closest to the features of the ambient audio or audio stream fingerprints. The driving event sound detector 134 may then determine that the ambient audio or audio stream includes a driving event sound when the ambient audio or audio stream fingerprint features match with or have more than a threshold amount of similarity with the audio fingerprint features for one of the predetermined driving event sounds. The driving event sound detector 134 may also determine that the ambient audio or audio stream includes the particular type of driving event sound in the predetermined driving event sound that matches with or has more than a threshold amount of similarity with the ambient audio or audio stream fingerprints.

In yet other implementations, the driving event sound detector 134 may detect a driving event sound based on metadata describing audio content from another application executing on the client device 10 or from a device 14, 92 communicatively connected to the client device 10. The metadata may indicate that the audio content includes a driving event sound, the type of driving event sound, and/or when the driving event sound will be played.

Figure 4:
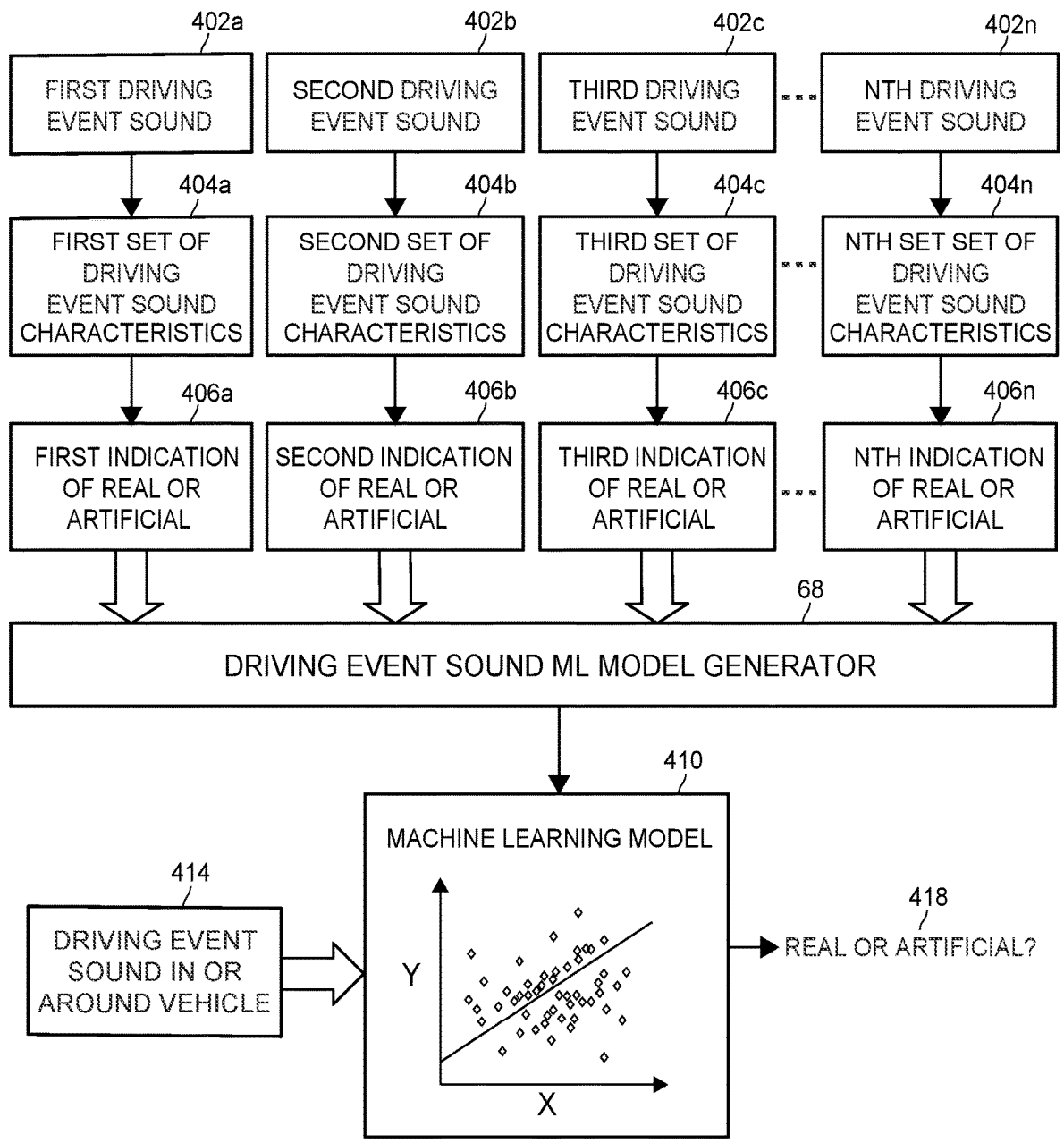
FIG. 4 is a combined block and logic diagram that illustrates the process for identifying whether a driving event sound is real or artificial based on characteristics of the driving event sound using a second machine learning model.

When a driving event sound is detected, the driving event sound detector 134 may determine whether the driving event sound is real or artificial. FIG. 4 schematically illustrates an example process for training a second machine learning model 410 for identifying whether a driving event sound is real or artificial and applying the characteristics of a detected driving event sound to the second machine learning model 410 to determine whether the detected driving event sound is real or artificial. As described above, the driving event sound ML model generator 68 in the server device 60 may generate the second machine learning model 410. The second machine learning model 410 may be generated using various machine learning techniques such as a regression analysis (e.g., a logistic regression, linear regression, or polynomial regression), k-nearest neighbors, decisions trees, random forests, boosting (e.g., extreme gradient boosting), neural networks (e.g., a convolutional neural network), support vector machines, deep learning, reinforcement learning, Bayesian networks, etc. To generate the second machine learning model 410, the driving event sound ML model generator 68 receives training data including a first driving event sound 402a having a first set of driving event sound characteristics 404a, and a first indication of whether the first driving event sound 402a is real or artificial 406a.

The driving event sound characteristics may include audio characteristics of the driving event sound as well as environmental characteristics at the vehicle 12 at the time of the driving event sound. The audio characteristics of the driving event sound may include frequencies, pitches, tones, amplitudes, wavelengths, etc. In some implementations, the audio characteristics of the driving event sound may include changes in frequency or changes in wavelength over time which may be indicative of a Doppler effect. The Doppler effect may indicate that the driving event sound is real and came from an external source that was moving relative to the vehicle 12. The environmental characteristics may include sensor data from the vehicle 12, such as sensor data from cameras within the vehicle 12, tire pressure sensors, vehicle door sensors, seat belt sensors, accelerometers, gyroscopes, positioning sensors, etc. Additionally, the driving event sound characteristics may include an indication of the type of driving event sound, such as a police siren, a fire truck siren, an ambulance siren, a vehicle honking, the sound of a vehicle collision, a vehicle malfunction alarm, etc. Still further, the driving event sound characteristics may include media content characteristics, such as whether a passenger is playing an electronic game in the vehicle 12, a type of electronic game being played, a name of the electronic game, whether the radio is playing within the vehicle 12, a name of the song or content currently being played, etc. The media content characteristics may be determined from metadata provided by another application 132 executing on the client device 10 via an API or by another device 92 via a short-range communication link.

The training data also includes a second driving event sound 402b having a second set of driving event sound characteristics 404b, and a second indication of whether the second driving event sound 402b is real or artificial 406b. Furthermore, the training data includes a third driving event sound 402c having a third set of driving event sound characteristics 404c, and a third indication of whether the third driving event sound 402c is real or artificial 406c. Still further, the training data includes an nth driving event sound 402n having an nth set of driving event sound characteristics 404n, and an nth indication of whether the nth driving event sound 402n is real or artificial 406n.

While the example training data includes four driving event sounds 402a-402n, this is merely an example for ease of illustration only. The training data may include any number of driving event sounds and corresponding driving event sound characteristics and indications of whether the driving event sound is real or artificial.

The driving event sound ML model generator 68 then analyzes the training data to generate a second machine learning model 410 for determining whether a driving event sound is real or artificial. In some implementations, the driving event sound ML model generator 68 generates a separate machine learning model for each type of driving event sound. While the second machine learning model 410 is illustrated as a linear regression model, the second machine learning model 410 may be another type of regression model such as a logistic regression model, a decision tree, a neural network, a hyperplane, or any other suitable machine learning model.

In any event, the driving event sound ML model generator 68 may provide the second machine learning model 410 to the client device 10. Then when the driving event sound detector 134 detects a driving event sound 414, such as during a navigation session, the driving event sound detector 134 may apply characteristics of the driving event sound 414 as in input to the second machine learning model 410 to determine whether the driving event sound 414 is real or artificial 418. Such a determination can be provided as an output of the second machine learning model 410.

As described above, machine learning is merely one example technique for determining whether a driving event sound is real or artificial. In other implementations, the driving event sound detector 134 may determine a driving event sound is artificial if the source of the driving event sound is an application executing on the client device 10 or another device 14, 92. In yet other implementations, the driving event sound detector 134 may determine a driving event sound is artificial by determining a geographic source of the driving event sound, and comparing the geographic source to the current location of the vehicle 12. For example, emergency vehicle sirens in different countries may have different audio characteristics. The driving event sound detector 134 may compare the audio characteristics of the driving event sound to audio characteristics of emergency vehicle sirens in different countries to determine the region of origin of the driving event sound. If the region of origin of the driving event sound differs from the current location of the vehicle 12, the driving event sound detector 134 may determine that the driving event sound is artificial. In other implementations, the driving event sound detector 134 may determine a driving event sound is artificial based on a change in frequency of the driving event sound over time. If the frequency of the driving event sound does not change over time by more than a threshold amount indicating a Doppler shift, the driving event sound detector 134 may determine that the source of the driving event sound is not moving relative to the vehicle 12, and therefore the driving event sound is artificial. In other implementations, the driving event sound detector 134 may determine that the driving event sound is artificial by comparing the ambient audio fingerprint or an audio fingerprint from the audio stream included in the audio playback data to audio fingerprints of predetermined artificial driving event sounds. When there is a match, the driving event sound detector 134 may determine that the audio includes an artificial driving event sound. The driving event sound detector 134 may also compare the ambient audio fingerprint or an audio fingerprint from the audio stream included in the audio playback data to audio fingerprints of predetermined real driving event sounds. When there is a match, the driving event sound detector 134 may determine that the audio includes a real driving event sound.

Figure 5A:
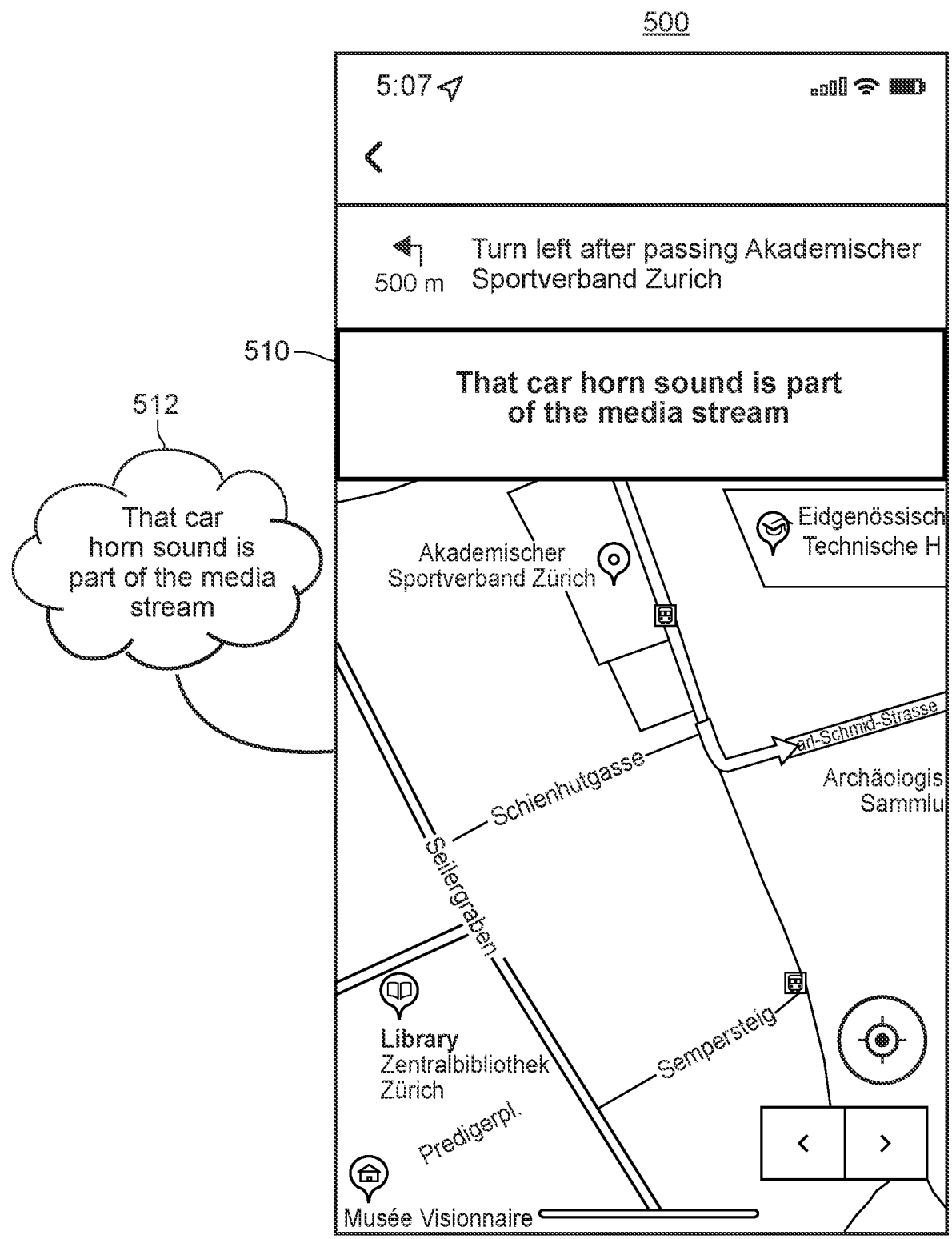
FIGS. 5A-5C are example navigation displays including notifications to the driver in response to detecting a driving event sound.
Figure 5B:
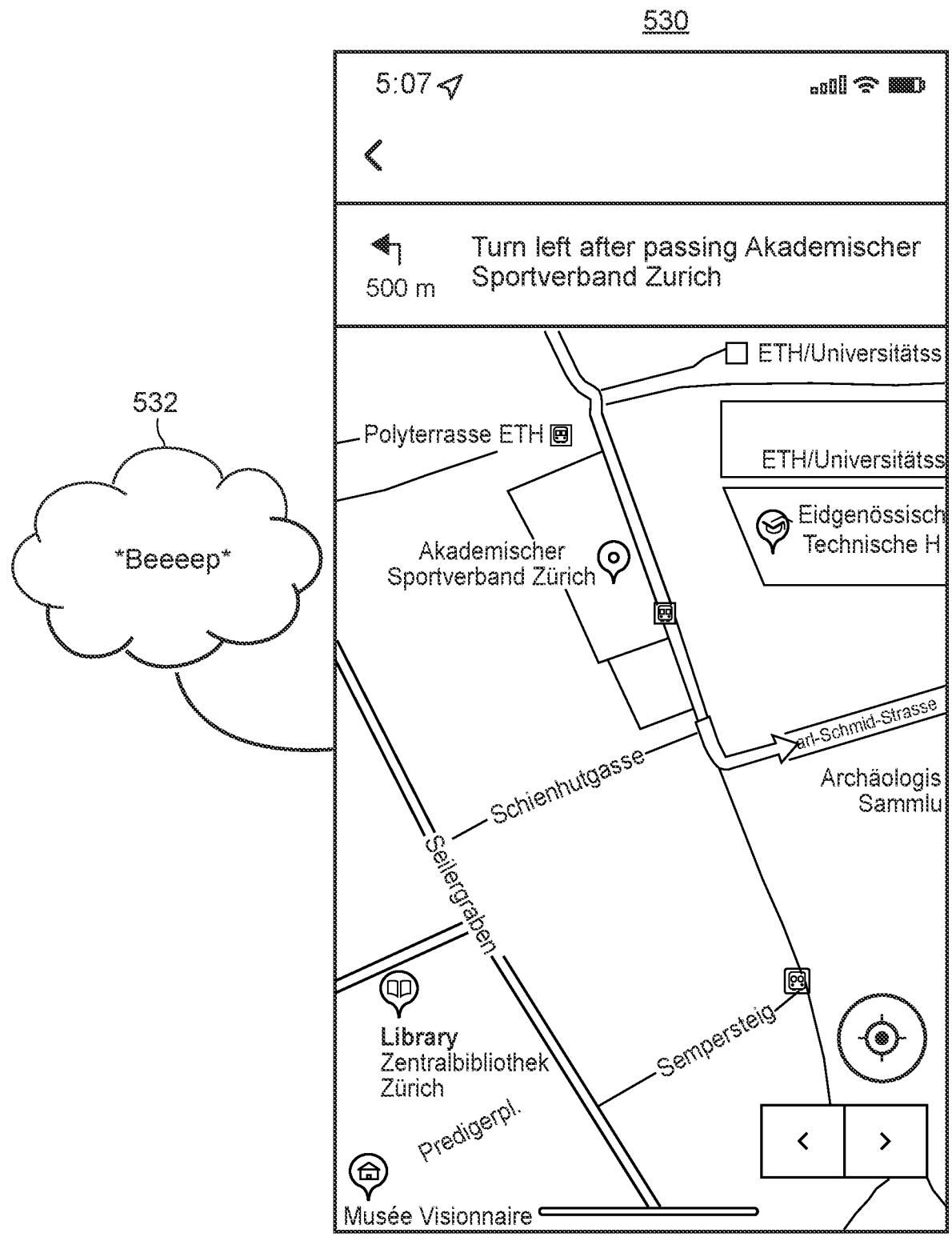
Figure 5C:
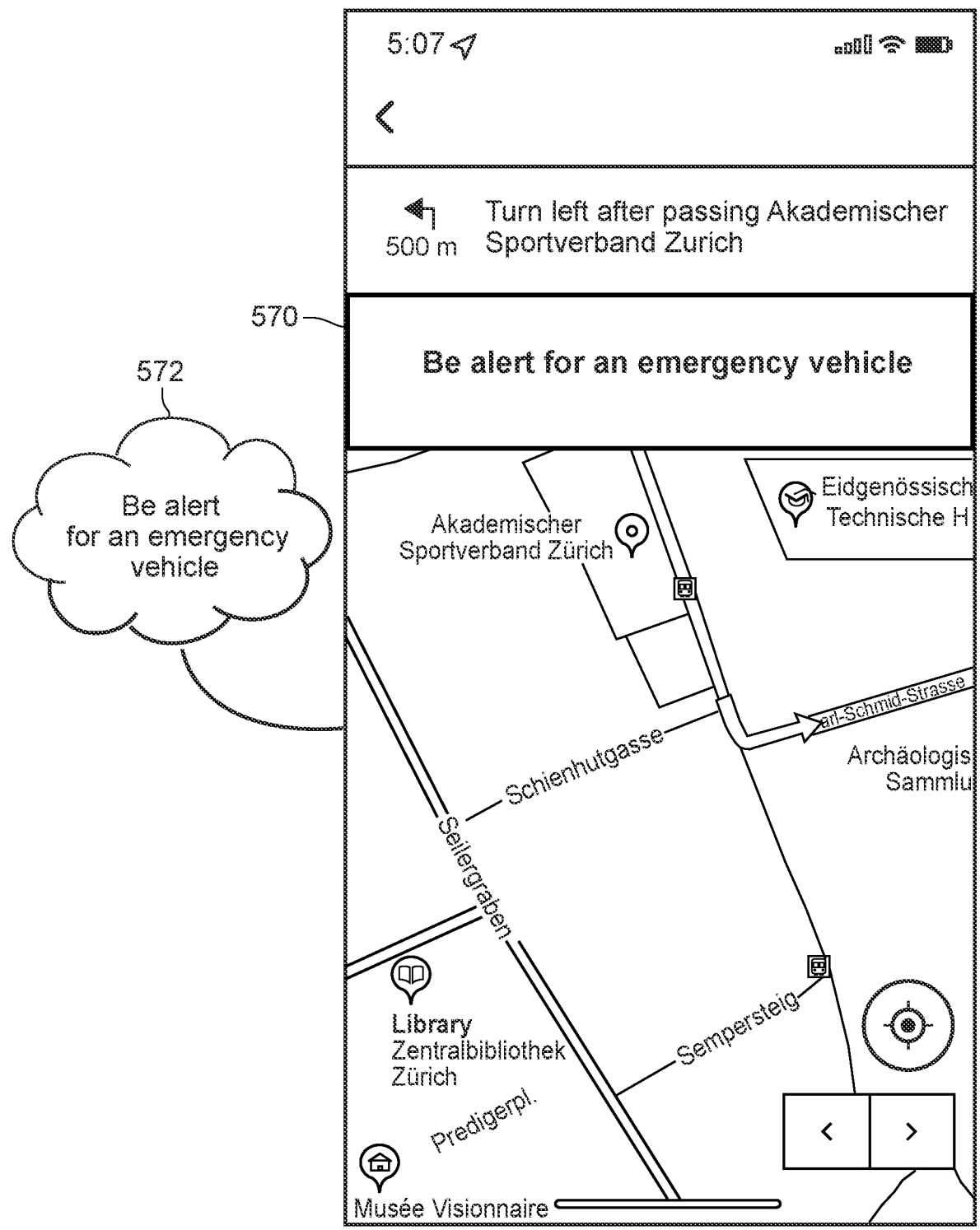

When a driving event sound is detected and determined to be real or artificial, the driving event sound detector 134 may provide a notification to the driver indicating whether the driving event sound is real or artificial. The notification may be presented on the display of the client device 10 or may be an audio notification presented via the speakers of the client device 10 or the vehicle head unit 14. FIGS. 5A-5C illustrate example navigation displays 500-560 which include notifications to the driver in response to detecting a driving event sound. As shown in the example navigation display 500 of FIG. 5A, a visual notification 510 may be presented as a banner within the navigation display 500. The visual notification 510 indicates that the driving event sound is artificial by stating, "That car horn sound is part of the media stream." In some implementations, the visual notification 510 may further provide an instruction to ignore the driving event sound. In addition or as an alternative to the visual notification 510, the client device 10 may present an audio notification 512, via the speakers, indicating that the car horn sound is part of the media stream.

In other implementations, the driving event sound detector 134 may notify the driver that the driving event sound is artificial using an earcon. An earcon is a brief, distinctive sound that represents a specific event, such as the arrival of an electronic mail message. FIG. 5B illustrates an example navigation display 530 including an audio notification 532 in the form of an earcon. The earcon may be a particular sound such as a beep, a long beep, or a set of beeps that signals to the driver that the driving event sound is artificial. The earcon may be generated so that it is distinct from the driving event sounds, such that the driver will not mistake the earcon for a continuation of the driving event sound.

FIG. 5C illustrates another example navigation display 560 presented when the driving event sound is real. In this scenario, the driving event sound detector 134 may provide a visual notification 570 to the driver indicating that the driving event sound is real and instructing the driver to be alert for the emergency vehicle indicated by the driving event sound. The visual notification 570 may be presented as a banner within the navigation display 560. In some implementations, the visual notification 570 may further provide an instruction on how to respond to the real driving event sound, such as to pull over. In addition or as an alternative to the visual notification 570, the client device 10 may present an audio notification 572, via the speakers, indicating that the driver should be alert for an emergency vehicle. As would be understood, any type of visual notification 570 may be provided as a confirmation that the driving event sound is real.

Example Method for Identifying Driving Event Sounds

Figure 6:
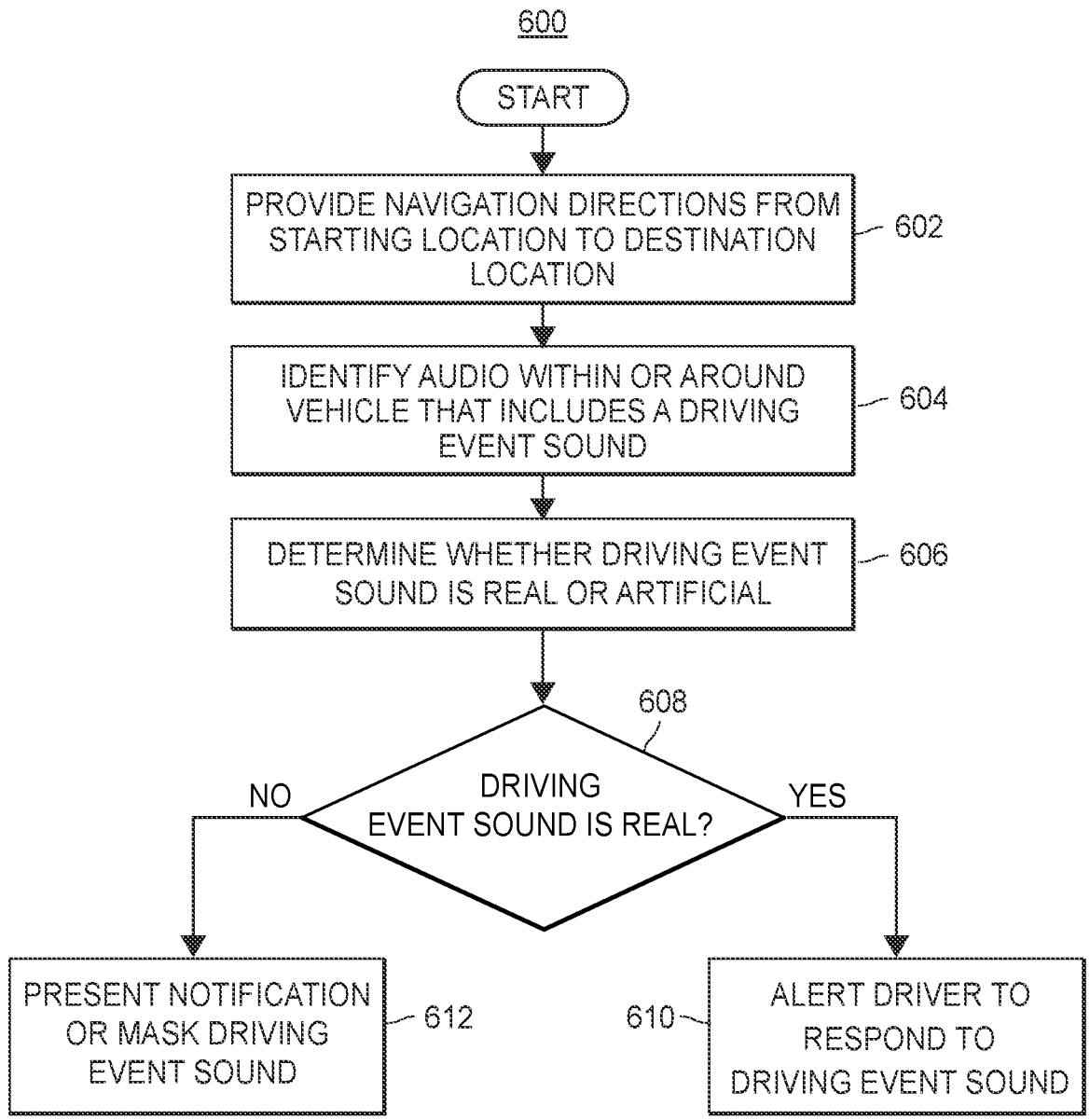
FIG. 6 is a flow diagram of an example method for identifying driving event sounds during a navigation session, which can be implemented in a client device.

FIG. 6 illustrates a flow diagram of an example method 600 for identifying driving event sounds during a navigation session. The method can be implemented in a set of instructions stored on a computer-readable memory and executable at one or more processors of the client device 10 within the vehicle 12. For example, the method can be implemented by the driving event sound detector 134 and/or the mapping application 122.

At block 602, a set of navigation instructions are provided from a starting location to a destination location. For example, when a user such as the driver requests navigation directions from a starting location to a destination location, the mapping application 122 may provide the request to a navigation data server 34. The navigation data server 34 may then provide a set of navigation directions to the client device 10 which may be presented by the mapping application 122.

Then at block 604, the driving event sound detector 134 may identify audio within or around the vehicle 12 that includes a driving event sound. More specifically, the driving event sound detector 134 may obtain audio playback data by communicating with other applications 132 executing on the client device 10 (e.g., via an API), or other devices within the vicinity of the client device 10 (e.g., a short-range communication link), such as the vehicle head unit 14 or other client devices 92. The driving event sound detector 134 may obtain an audio stream from the audio playback data. The driving event sound detector 134 may also capture an ambient audio fingerprint of the audio within the area via a microphone, for example. The driving event sound detector 134 may then compare the ambient audio fingerprint or an audio fingerprint from the audio stream included in the audio playback data to audio fingerprints of predetermined driving event sounds. When there is a match, the driving event sound detector 134 may determine that the audio includes a driving event sound. In other implementations, the driving event sound detector 134 may apply the ambient audio features or audio features from the audio stream to a trained machine learning model for identifying driving event sounds, such as the first machine learning model 310 as shown in FIG. 3.

In response to identifying audio within or around the vehicle 12 that includes a driving event sound, the driving event sound detector 134 may determine whether the driving event sound is real or artificial (block 606). More specifically, the driving event sound detector 134 may identify characteristics of the driving event sound, such as audio characteristics, environmental characteristics at the vehicle 12 at the time of the driving event sound, the type of driving event sound, etc. The driving event sound detector 134 may apply the characteristics of the driving event sound to a trained machine learning model for determining whether a driving event sound is real or artificial, such as the second machine learning model 410 as shown in FIG. 4.

In other implementations, the driving event sound detector 134 may determine a driving event sound is artificial if the source of the driving event sound is an application executing on the client device 10 or another device 14, 92. In yet other implementations, the driving event sound detector 134 may determine a driving event sound is artificial by determining a geographic source of the driving event sound, and comparing the geographic source to the current location of the vehicle 12. If the region of origin of the driving event sound differs from the current location of the vehicle 12, the driving event sound detector 134 may determine that the driving event sound is artificial. In other implementations, the driving event sound detector 134 may determine a driving event sound is artificial based on a change in frequency of the driving event sound over time. If the frequency of the driving event sound does not change over time by more than a threshold amount indicating a Doppler shift, the driving event sound detector 134 may determine that the source of the driving event sound is not moving relative to the vehicle 12, and therefore the driving event sound is artificial.

In yet other implementations, the driving event sound detector 134 may determine that the driving event sound is artificial by comparing the ambient audio fingerprint or an audio fingerprint from the audio stream included in the audio playback data to audio fingerprints of predetermined artificial driving event sounds. When there is a match, the driving event sound detector 134 may determine that the audio includes an artificial driving event sound. The driving event sound detector 134 may also compare the ambient audio fingerprint or an audio fingerprint from the audio stream included in the audio playback data to audio fingerprints of predetermined real driving event sounds. When there is a match, the driving event sound detector 134 may determine that the audio includes a real driving event sound.

If the driving event sound is real, the driving event sound detector 134 may alert the driver to respond to the driving event sound (block 610) or may otherwise confirm that the driving event sound is real. For example, the driving event sound detector 134 may provide a visual or audio notification to the driver, such as the notifications 570, 572 as shown in FIG. 5C, indicating that the driving event sound is real. The notification may also instruct the driver to respond appropriately to the driver event sound or may provide explicit instructions on how to respond to the driver event sound, such as pull over, slow down, call for help, take the vehicle in for service, etc.

On the other hand, if the driving event sound is artificial, the driving event sound detector 134 presents a notification to the driver or masks the driving event sound to substantially prevent the driver from hearing the driving event sound and being unnecessarily distracted (block 612). The driving event sound detector 134 may provide a visual or audio notification to the driver, such as the notifications 510, 512 as shown in FIG. 5A, indicating that the driving event sound is artificial. The notification may also instruct the driver to ignore the driving event sound.

The driving event sound detector 134 may mask the driving event sound by muting or decreasing the volume on the audio during the driving event sound. For example, when the driving event sound is provided by an application 132 executing on the client device 10, the driving event sound detector 134 may communicate with the application 132 via an API to instruct the application 132 to decrease or mute the volume on the audio during the driving event sound. When the driving event sound is provided by another device 14, 92 communicatively coupled to the client device 10, the driving event sound detector 134 may communicate with the other device 14, 92 via a short-range communication link to transmit a request to the other device 14, 92 to decrease or mute the volume on the audio during the driving event sound.

In some implementations, the driving event sound detector 134 determines to mute or decrease the volume proactively before the driving event sound is played. For example, the driving event sound detector 134 may be able to proactively determine to mute or decrease the volume for the artificial driving event sound, when the artificial driving event sound is identified through metadata describing audio content before it has been played. Beneficially, this prevents the driver from hearing any portion of the artificial driving event sound. In other implementations, the driving event sound detector 134 determines to mute or decrease the volume for the driving event sound as the driving event sound is played to prevent the driver from hearing at least a portion of the driving event sound.

In other implementations, the driving event sound detector 134 may mask the driving event sound by filtering the driving event sound from the audio stream. More specifically, the driving event sound detector 134 may cause a filter to be provided to the audio stream, such as a bandpass filter or a machine learning model for filtering driving event sounds. The driving event sound detector 134 may provide the filter to the other application 132 executing on the client device 10 or the other device 14, 92 communicatively coupled to the client device 10 to filter the driving event sound from the audio stream.

In some implementations, the driving event sound detector 134 performs the filtering proactively before the driving event sound is played. For example, the driving event sound detector 134 may be able to proactively filter the artificial driving event sound, when the artificial driving event sound is identified through metadata describing audio content before it has been played. In other implementations, the driving event sound detector 134 performs the filtering as the driving event sound is played to filter at least a portion of the driving event sound.

In yet other implementations, the driving event sound detector 134 may mask the driving event sound by emitting a noise cancelling sound via the speakers of the client device 10 or causing the speakers within the vehicle 12 to emit the noise cancelling sound to destructively interfere with the driving event sound and muffle or remove the driving event sound. The noise cancelling sound may have the same or a similar amplitude/frequency as the driving event sound and an inverted phase from the phase of the driving event sound.

The driving event sound detector 134 may determine the amplitude and phase of the driving event sound based on the characteristics of the audio stream that includes the driving event sound. In other implementations, the driving event sound detector 134 may determine the amplitude and phase of the driving event sound based on a set of predetermined characteristics for a particular type of driving event sound (e.g., an ambulance siren).

Then the driving event sound detector 134 may generate the noise cancelling sound by generating an audio signal with the same or a similar amplitude as the driving event sound and an inverted phase from the phase of the driving event sound. The driving event sound detector 134 may then play the noise cancelling sound via the speakers of the client device 10 or transmit an indication of the noise cancelling sound to the vehicle head unit 14 to play the noise cancelling sound via the speakers 26 within the vehicle 12.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 600 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client device, as described herein). The method 600 may be included as part of any backend server (e.g., a map data server, a navigation server, or any other type of server computing device, as described herein), client device modules of the example environment, for example, or as part of a module that is external to such an environment. Though the figures may be described with reference to the other figures for ease of explanation, the method 600 can be utilized with other objects and user interfaces. Furthermore, although the explanation above describes steps of the method 600 being performed by specific devices (such as a server device 60 or client device 10), this is done for illustration purposes only. The blocks of the method 600 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for identifying driving event sounds through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for identifying driving event sounds during a navigation session, the method comprising:
providing, by one or more processors in a vehicle, a set of navigation directions for traversing from a starting location to a destination location along a route;
during navigation to the destination location:
identifying, by the one or more processors, audio that includes a driving event sound from within the vehicle or an area surrounding the vehicle;
in response to determining that the audio includes the driving event sound, determining, by the one or more processors, whether the driving event sound is artificial; and
in response to determining that the driving event sound is artificial:
presenting, by the one or more processors, a notification to the driver indicating that the driving event sound is artificial, or masking the driving event sound to prevent the driver from hearing the driving event sound.

2. The method of claim 1, wherein identifying audio that includes a driving event sound includes:
obtaining, by the one or more processors, audio playback data from an application executing on a client device;
obtaining, by the one or more processors, audio playback data from a device communicatively coupled to the client device; or
obtaining, by the one or more processors, ambient audio.

3. The method of claim 2, further comprising:
comparing, by the one or more processors, the audio playback data from the application or the device or audio fingerprints included in the ambient audio to one or more audio fingerprints of predetermined driving event sounds.

4. The method of claim 2, further comprising:
training a machine learning model using (i) a set of audio streams, and (ii) an indication of a driving event sound corresponding to at least some of the audio streams in the set of audio streams; and
applying, by the one or more processors, the audio playback data from the application or the device or the ambient audio to the machine learning model to determine whether the audio includes a driving event sound.

5. The method of claims 2, wherein determining whether the driving event sound is artificial includes:
determining, by the one or more processors, that the driving event sound is artificial in response to determining that the driving event sound is included in the audio playback data from the application or the device.

6. The method of claims 2, wherein determining whether the driving event sound is artificial includes:
training a machine learning model using (i) a set of audio streams corresponding to driving event sounds, and for each audio stream in the set of audio streams, (ii) an indication of whether the driving event sound is from a real or artificial source; and
applying, by the one or more processors, the audio playback data from the application or the device or the ambient audio to the machine learning model to determine whether driving event sound in the audio is artificial.

7. The method of claims 2, wherein determining whether the driving event sound is artificial includes:
determining, by the one or more processors, a geographic source of the driving event sound;
comparing, by the one or more processors, the geographic source of the driving event sound to a current location of the vehicle; and
determining, by the one or more processors, that the driving event sound is artificial when the geographic source of the driving event sound differs from the current location of the vehicle.

8. The method of claim 1, wherein masking the driving event sound includes:
filtering, by the one or more processors, the driving event sound from the audio playback data from the application or the device.

9. The method of claim 1, wherein the driving event sound includes at least one of: an emergency vehicle siren, a sound of a vehicle collision, a vehicle malfunction alarm, or a vehicle horn honking.

10. A client device for identifying driving event sounds, the client device comprising:
one or more processors; and
a non-transitory computer-readable memory coupled to the one or more processors and storing instructions thereon that, when executed by the one or more processors, cause the client device to:
identify audio that includes a driving event sound from within a vehicle or an area surrounding the vehicle;
in response to determining that the audio includes the driving event sound, determine whether the driving event sound is artificial; and
in response to determining that the driving event sound is artificial:
present a notification to the driver indicating that the driving event sound is artificial, or mask the driving event sound to prevent the driver from hearing the driving event sound.

11. The client device of claim 10, wherein to identify audio that includes a driving event sound, the instructions cause the client device to:
obtain audio playback data from an application executing on the client device;
obtain audio playback data from a device communicatively coupled to the client device; or
obtain ambient audio.

12. The client device of claim 11, wherein the instructions further cause the client device to:
compare the audio playback data from the application or the device or audio fingerprints included in the ambient audio to one or more audio fingerprints of predetermined driving event sounds.

13. The client device of claim 11, wherein the instructions further cause the client device to:
apply the audio playback data from the application or the device or the ambient audio to a trained machine learning model, the trained machine learning model being trained to determine whether audio includes a driving event sound, the trained machine learning having been trained using training data including (i) a set of audio streams, and (ii) an indication of a driving event sound corresponding to at least some of the audio streams in the set of audio streams.

14. The client device of claim 11, wherein to determine whether the driving event sound is artificial, the instructions cause the client device to:
determine that the driving event sound is artificial in response to determining that the driving event sound is included in the audio playback data from the application or the device.

15. The client device of claim 11, to determine whether the driving event sound is artificial, the instructions cause the client device to:
apply the audio playback data from the application or the device or the ambient audio to a trained machine learning model, the trained machine learning model being trained to determine whether a driving event sound in audio is from a real or artificial source, the trained machine learning having been trained using training data including (i) a set of audio streams corresponding to driving event sounds, and for each audio stream in the set of audio streams, (ii) an indication of whether the driving event sound is from a real or artificial source.

16. The client device of claim 11, wherein to determine whether the driving event sound is artificial, the instructions cause the client device to:
determine a geographic source of the driving event sound;
compare the geographic source of the driving event sound to a current location of the vehicle; and
determine that the driving event sound is artificial when the geographic source of the driving event sound differs from the current location of the vehicle.

17. A non-transitory computer-readable memory coupled to one or more processors and storing instructions thereon that, when executed by the one or more processors, cause the one or more processors to:
identify audio that includes a driving event sound from within a vehicle or an area surrounding the vehicle;
in response to determining that the audio includes the driving event sound, determine whether the driving event sound is artificial; and
in response to determining that the driving event sound is artificial:
present a notification to the driver indicating that the driving event sound is artificial, or mask the driving event sound to prevent the driver from hearing the driving event sound.

18. The non-transitory computer-readable memory of claim 17, wherein to identify audio that includes a driving event sound, the instructions cause the one or more processors to:
obtain audio playback data from an application executing on the client device;
obtain audio playback data from a device communicatively coupled to the client device; or
obtain ambient audio.

19. The non-transitory computer-readable memory of claim 18, wherein the instructions further cause the one or more processors to:
compare the audio playback data from the application or the device or audio fingerprints included in the ambient audio to one or more audio fingerprints of predetermined driving event sounds.

20. The non-transitory computer-readable memory of claim 18, wherein the instructions further cause the one or more processors to:
apply the audio playback data from the application or the device or the ambient audio to a trained machine learning model, the trained machine learning model being trained to determine whether audio includes a driving event sound, the trained machine learning having been trained using training data including (i) a set of audio streams, and (ii) an indication of a driving event sound corresponding to at least some of the audio streams in the set of audio streams.

* * * * *

UNITED STATES PATENT AND TRADEMARK OFFICE
CERTIFICATE OF CORRECTION

PATENT NO. : 11,814,062 B2
APPLICATION NO. : 17/273673
DATED : November 14, 2023
INVENTOR(S) : Matthew Sharifi et al.

It is certified that error appears in the above-identified patent and that said Letters Patent is hereby corrected as shown below:

In the Claims

At Column 20, Line 28, "claims" should be -- claim --.

At Column 20, Line 35, "claims" should be -- claim --.

At Column 20, Line 47, "claims" should be -- claim --.

Signed and Sealed this
Seventeenth Day of September, 2024

Katherine Kelly Vidal
*Director of the United States Patent and Trademark Office*